(12) United States Patent
Graffagnino et al.

(10) Patent No.: US 9,155,020 B1
(45) Date of Patent: Oct. 6, 2015

(54) BEST BACKHAUL AVAILABLE LINK QUALITY

(71) Applicant: Oceus Networks, Inc., Reston, VA (US)

(72) Inventors: Vincent Charles Graffagnino, Prosper, TX (US); Yatkwan Tang, Coppell, TX (US)

(73) Assignee: OCEUS NETWORKS, INC., Reston, VA (US)

( * ) Notice: Subject to any disclaimer, the term of this patent is extended or adjusted under 35 U.S.C. 154(b) by 0 days.

(21) Appl. No.: 14/625,815

(22) Filed: Feb. 19, 2015

(51) Int. Cl.
*H04J 1/16* (2006.01)
*H04W 40/12* (2009.01)
*H04L 12/26* (2006.01)
*H04W 24/08* (2009.01)

(52) U.S. Cl.
CPC ........... *H04W 40/12* (2013.01); *H04L 43/0858* (2013.01); *H04L 43/0894* (2013.01); *H04W 24/08* (2013.01)

(58) Field of Classification Search
CPC . H04W 40/02; H04W 40/12; H04W 72/0433; H04W 92/045
USPC .................................................. 370/241–252
See application file for complete search history.

(56) References Cited

U.S. PATENT DOCUMENTS

| | | | |
|---|---|---|---|
| 5,970,406 A | 10/1999 | Komara | |
| 6,487,187 B1 | 11/2002 | Schmutz et al. | |
| 7,376,102 B2 | 5/2008 | Shahidi et al. | |
| 7,450,948 B2 | 11/2008 | Argyropoulos et al. | |
| 7,796,605 B2 | 9/2010 | Percen et al. | |
| 8,068,507 B2 | 11/2011 | Roy | |
| 8,185,060 B2 | 5/2012 | Agashe et al. | |
| 8,666,420 B2 | 3/2014 | Rangarajan et al. | |
| 8,750,321 B2 | 6/2014 | Roy | |
| 2005/0159165 A1 | 7/2005 | Argyropoulos et al. | |
| 2005/0288012 A1 | 12/2005 | Morgan | |
| 2007/0010271 A1 | 1/2007 | Roy | |
| 2007/0127413 A1 | 6/2007 | Shahidi et al. | |
| 2007/0287390 A1 | 12/2007 | Murphy et al. | |
| 2008/0025317 A1 | 1/2008 | Pecen et al. | |

(Continued)

OTHER PUBLICATIONS

Rao et al, Protocol Signaling Procedures in LTE, Radysis Whitepaper, 2011.

(Continued)

*Primary Examiner* — Kan Yuen
(74) *Attorney, Agent, or Firm* — Charles B. Lobsenz; Symbus Law Group, LLC; Milena Sukovic

(57) ABSTRACT

A method of routing backhaul link communications in a wireless communication network including communicatively coupling an apparatus to each of a plurality of peers in the wireless communication network with each of a respective backhaul link of a plurality of backhaul links. The method includes collecting metrics associated with each backhaul link of the plurality of backhaul links and calculating backhaul link parameters based upon the collected metrics. The method includes determining a link quality for each of the plurality of backhaul links based upon the calculated backhaul link parameters, and determining a best backhaul link available based on the determined link qualities, and routing communications between the apparatus and one of the peers of the wireless communication system via the determined best backhaul link available. The collected metrics include metrics besides a transmission success rate of Hello packets.

20 Claims, 8 Drawing Sheets

(56) References Cited

U.S. PATENT DOCUMENTS

| | | | |
|---|---|---|---|
| 2008/0107051 A1* | 5/2008 | Chen | 370/310 |
| 2009/0252127 A1 | 10/2009 | Rangarajan et al. | |
| 2009/0257357 A1* | 10/2009 | Marsh | 370/252 |
| 2009/0264123 A1 | 10/2009 | Agashe et al. | |
| 2010/0003030 A1 | 1/2010 | Gilfedder et al. | |
| 2010/0265913 A1 | 10/2010 | Gorokhov et al. | |
| 2012/0099457 A1 | 4/2012 | Roy | |
| 2012/0327794 A1 | 12/2012 | Han et al. | |
| 2013/0077570 A1* | 3/2013 | Lee et al. | 370/328 |
| 2013/0279403 A1 | 10/2013 | Takaoka et al. | |
| 2013/0310052 A1* | 11/2013 | Timus et al. | 455/445 |
| 2014/0050085 A1* | 2/2014 | Hong et al. | 370/230 |
| 2014/0092731 A1 | 4/2014 | Gupta | |
| 2014/0092803 A1 | 4/2014 | Picker | |
| 2014/0105136 A1 | 4/2014 | Tellado et al. | |
| 2014/0106743 A1 | 4/2014 | Esparza et al. | |
| 2014/0160939 A1 | 6/2014 | Arad et al. | |
| 2014/0254400 A1* | 9/2014 | Zhou et al. | 370/252 |
| 2015/0092538 A1* | 4/2015 | Vasseur et al. | 370/225 |
| 2015/0098346 A1* | 4/2015 | Guo et al. | 370/252 |

OTHER PUBLICATIONS

Agouros, Dynamic Routing in Linux with Quagga, Admin Network & Security online magazine, Linux New Media, 2014.
Klein, Implemenattion of an Ad-hoc Routing Module for an Experimental Network, Sep. 2004.
Aruba Networks, Chapter 9: Planning Mesh Backhaul Layer, 2015.
Tabula, Wireless Market, 2014.

\* cited by examiner

600

```
struct bba_lq{
  uint8_t valueLq;
  uint8_t valueNlq;
};
```

```
struct bba_lq_hello{
  struct bba_lq smoothed_lq;
  struct bba_lq lq;
  uint8_t windowSize;
  uint16_t last_seq_nr;
  uint16_t missed_hellos;
  uint16_t recvdHello[LQ_WINDOW];
  uint16_t totalHello[LQ_WINDOW];
  float helloLatency[LQ_WINDOW];
};
```

```
struct link_entry{
  union olsr_ip_addr local_iface_addr;
  union olsr_ip_addr neighbor_iface_addr;
  const struct interface *inter;
  ......
  /* link quality parameters */
  uint32_t hello_latency; // hello packet latency in ms
  float    link_latency; // average link latency in ms
  float    packet_loss; // average hello packet loss rate
};
```

```
struct hello_message{
  olsr_reltime vtime;
  olsr_reltime htime;
  union olsr_ip_addr source_addr;
  uint16_t packet_seq_number;
  uint8_t hop_count;
  uint8_t ttl;
  uint8_t willingness;
  uint32_t txtime; // transmission time of HELLO message
  struct hello_neighbor *neighbors;
};
```

FIG. 5

Monitored Backhaul Link Routes

| Routes | Interfaces | Sync | Configuration | | |
|---|---|---|---|---|---|
| Destination | Next Hop | | Interface | Route Cost | |
| 10.15.20.2 | 10.15.20.3 | | eth3 | 1.5 | |
| 10.15.20.3 | ---- | | eth3 | 1.0 | |
| 10.15.20.5 | 10.15.20.3 | | eth3 | 1.9 | |
| 10.15.20.7 | ---- | | eth5 | 2.1 | |

FIG. 6

Monitored Backhaul Configuration

| Routes | Interfaces | Sync | Configuration |

Interface Preference

| Interface | Priority |
|---|---|
| eth3 | 1 |
| eth5 | 1 |

Priority Preference Weight

High ▾

Submit

| User Preference | WNHR(I) | WNLT(I) | WNLP(I) |
|---|---|---|---|
| High | 20% | 20% | 60% |
| Medium | 30% | 30% | 40% |
| Low | 40% | 40% | 20% |

FIG. 8

BEST BACKHAUL AVAILABLE LINK QUALITY

FIELD OF DISCLOSURE

The present disclosure relates generally to evaluating backhaul link quality in a telecommunication system, and more particularly to a method, system, and control server device implementing a procedure for selecting a best backhaul link from a plurality of available backhaul links in a telecommunication system.

BACKGROUND

Conventional telecommunication systems designed to route across nodes, such as a mobile ad hoc network (MANET), determine routes using proactive link-state routing protocols, such as Optimized Link State Routing (OLSR) protocol, which is a layer 3 IP routing protocol optimized for mobile ad hoc networks. OLSR uses Hello and topology control messages to discover peers and exchange information of topology to peers so that routes for communications are immediately provided when needed.

OLSR does not advertise all links between nodes, but advertises only the links to neighbors designated as multipoint relays (MPRs). Nodes select MPRs such that there exists a path to each of its 2-hop neighbors via a node selected as an MPR. OLSR updates information of links states by continuously exchanging topology data often enough to make sure that the database does not remain unsynchronized for extended periods of time.

Links are determined up or down depending upon whether a number of Hello packets have been received recently. In determining link quality the OLSR routing daemon uses the packet loss rate as the only metric to evaluate quality of a backhaul link.

In wireless networks, where links often exhibit intermediate rates of packet loss, conventional link quality assessments do not work well. Additionally, conventional link quality assessments do not provide an adequate solution for mobile telecommunication systems, including mobile base stations. Conventional proactive link-state routing protocols do not provide an adequate solution to assessing quality of a backhaul link or finding a best backhaul link for communications across a mobile ad hoc network topology.

SUMMARY

In an embodiment, an apparatus for routing backhaul link communications in a wireless communication network, includes a plurality of backhaul links each link communicatively coupling the apparatus to one of a plurality of peers in the wireless communication network. The apparatus includes a backhaul link metric collection module which collects metrics associated with each backhaul link of the plurality of backhaul links, and a backhaul link parameter calculation module which calculates one or more calculated backhaul link parameters based upon the collected metrics, the one or more calculated parameters includes a parameter besides a transmission success rate of Hello packets. The apparatus includes a best backhaul link quality determination module, which determines a link quality for each of the plurality of backhaul links based upon the calculated backhaul link parameters, and a best backhaul available link quality determination module which determines a best backhaul link available based on the determined link qualities. The apparatus includes a communications routing module which routes communications between the apparatus and one of the peers of the wireless communication system via the determined best backhaul link available.

In an embodiment, a method of routing backhaul link communications in a wireless communication network includes communicatively coupling an apparatus to each of a plurality of peers in the wireless communication network with each of a respective backhaul link of a plurality of backhaul links, collecting metrics associated with each backhaul link of the plurality of backhaul links, calculating backhaul link parameters based upon the collected metrics, determining a link quality for each of the plurality of backhaul links based upon the calculated backhaul link parameters, determining a best backhaul link available based on the determined link qualities, and routing communications between the apparatus and one of the peers of the wireless communication system via the determined best backhaul link available. The collected metrics include metrics besides a transmission success rate of Hello packets.

In an embodiment, an apparatus for routing backhaul link communications in a wireless communication network, includes a plurality of backhaul links each link communicatively coupling the apparatus to one of a plurality of peers in the wireless communication network. The apparatus includes a backhaul link metric collection module which collects metrics associated with each backhaul link of the plurality of backhaul links, and a backhaul link parameter calculation module which calculates one or more calculated backhaul link parameters based upon the collected metrics, the one or more calculated parameters includes a parameter besides a transmission success rate of Hello packets. The apparatus includes a best backhaul link quality determination module, which determines a link quality for each of the plurality of backhaul links based upon the calculated backhaul link parameters, and a best backhaul available link quality determination module which determines a best backhaul link available based on the determined link qualities. The apparatus includes a communications routing module which routes communications between the apparatus and one of the peers of the wireless communication system via the determined best backhaul link available. The parameters include, for each link 1, a normalized transmission success rate $NHR(1)$, a normalized link delay value $NLT(1)$, a normalized link priority value $NLP(1)$, an associated weight $WNHR(1)$ for the normalized transmission success rate, an associated weight $WNLT(1)$ for the normalized link delay value, and an associated weight $WNLP(1)$ for the normalized link priority value; and wherein determining the link quality $LQ(1)$ for each of the plurality of backhaul links includes using a formula wherein $LQ(1)=(NHR(1)\times WNHR(1)+NLT(1)\times WNLT(1)+NLP(1)\times WNLP(1))/10$.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of some of those embodiments.

FIG. 5 illustrates a Hello data structure used for calculating the best backhaul available link quality (BBA-LQ) cost in accordance with an embodiment of the present disclosure.

FIG. 6 illustrates a GUI display of route cost results for a particular route in a routing table in accordance with an embodiment of the present disclosure.

FIG. 8 illustrates a GUI display for an operator to configure the BBA-LQ parameters in accordance with an embodiment of the present disclosure.

Figure 1:
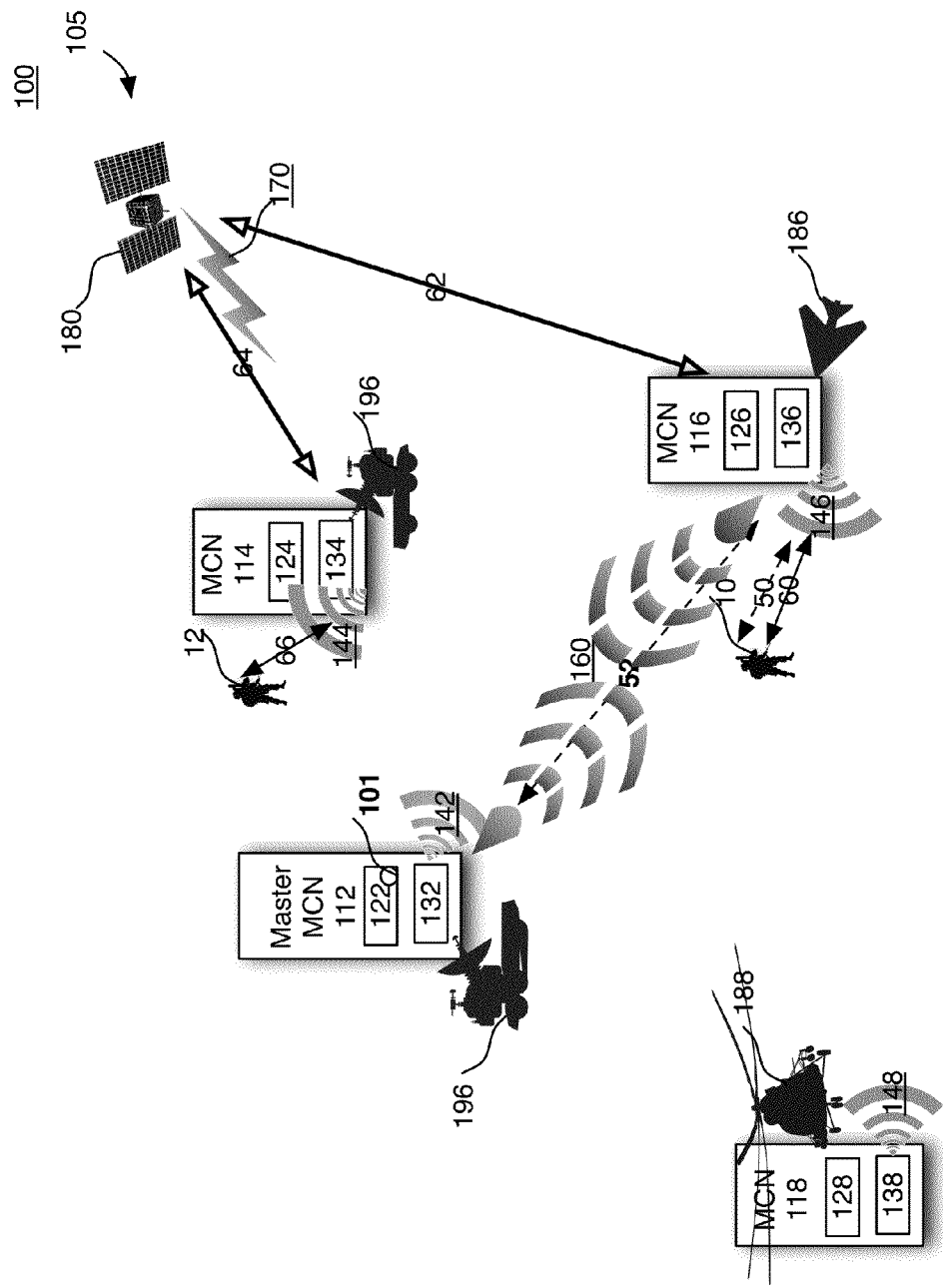
FIG. 1 is a block diagram of example architecture of a network including a best backhaul available link quality determination module in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure herein.

The apparatus and method components have been represented where appropriate by conventional symbols in the drawings, showing only those specific details that are pertinent to understanding the embodiments of the disclosure herein so as not to obscure the disclosure with details that will be readily apparent to those of ordinary skill in the art having the benefit of the description herein.

DETAILED DESCRIPTION

Wireless communication network architectures have evolved from transporting voice data services by using telephone circuits, to more recently transporting voice data and other data, such as streaming video and text message services using packet data. In an embodiment, a system, such as a fourth generation wireless communications network includes a best backhaul link quality determination module. The system may be a communication system that delivers packet data across an Evolved Packet Core (EPC) System (EPS). The EPS may provide IP connectivity between a User Equipment (UE) and an external packet data network using an evolved Universal Mobile Telecommunications System (UMTS) Terrestrial Radio Access (e-UTRA) network (e-UTRAN).

FIG. 1 is a block diagram of example architecture of a network including a best backhaul available link quality determination module in accordance with an embodiment of the present disclosure. In an embodiment, system 100 includes a large network, which can be referred to as a Network Of smaller Mobile cellular networks (NOM) (e.g., NOM 105). NOM 105 includes smaller networks of Mobile Cellular Networks (MCN). A MCN can include one or more control server devices and one or more radio access devices. In an embodiment, wireless system 100 can be an LTE system having a network architecture that is based on an IP address scheme, an evolved packet core (EPC) system (EPS), and an evolved Universal Mobile Telecommunications System (UMTS) Terrestrial Radio Access (e-UTRA) network (e-UT-RAN).

System 100 can include embodiments of any type of wireless telecommunication system architecture having a backbone network and an apparatus for routing backhaul link communications, which includes a best backhaul link quality determination module 101. In an embodiment, system 100 may be a very large network of smaller sub-networks. In an embodiment, system 100 may be a large network 105 of smaller sub-networks of portable 4th generation (4G) Long Term Evolution (LTE) tactical broadband based rugged modular hardware components, such as a network of Xiphos™ systems available from Oceus Networks, Inc. located in Reston, Va. In the embodiments described herein the term node, MCN and Xiphos™ can be interchanged and integrate with the described embodiments.

In an embodiment, system 100 can include a Universal Mobile Telecommunications System (UMTS) or a Global System for Mobile communications (GSM) network, or any earlier or later developed system with mobility management devices and backhaul link routing devices. In an embodiment, the NOM 105 of system 100 is a network of Xiphos™ (NOX) designated by assigning a local Public Land Mobile Network (PLMN) for a group of subscriber UE and Xiphos. Each operator providing mobile services can have its own PLMN designation. In an embodiment, an MCN can be a Xiphos™. The group of Xiphos™ servicing the PLMN can be as small as two Xiphos™ nodes (master and secondary) or have many secondary nodes. A NOX (e.g., NOM 105) can have a single master node or more.

In an embodiment, a Xiphos™ can be designated a master role (e.g., MCN 112) in the NOX (e.g., NOM 105). A function of the master node can be to ensure all of its secondary nodes are synced with configuration data for successful handovers of UEs between all nodes. The master node can also be a valid Xiphos™ peer node. The master can be a fully functioning Xiphos™ node, which itself can handle handovers to and from any peer nodes (e.g., MCN 114, 116, 118). A secondary node can listen for data configuration updates from the master node. The secondary node can configure a peer node to allow for seamless handover of UEs to and from a peer node. A peer node is any node within the NOX (e.g., NOM 105) for which a Xiphos™ has configuration data to allow a UE to handover to another peer node. Synchronization is achieved by having the master push NOX (e.g., NOM 105) configuration data to all secondary nodes.

A node can include a control server device, which can be a core server in an EPS (e.g., 122). A base station can be a type of radio access component (e.g., 132) of an EPS, such as an enhanced Node B (eNB) device. In an embodiment, a base station can be communicatively coupled with a control server device to provide communications between a UE (e.g., UE 10 or UE 12) and a reconnaissance device, such as a drone (186). A base station can be communicatively coupled with a control server device to provide communications between at least two user equipment (UE) devices in a single coverage area that corresponds to a communications frequency controlled by the base station. In an embodiment, a base station can be communicatively coupled with a control server device to provide communications between at least two user equipment (UE) devices across a larger network, e.g., between a UE using a first frequency of a first base station associated with a first control server device and a UE using a frequency of a second base station associated with a second control server device. In a cellular network the first and second frequency can be the same re-used frequency. A control server device can include a control and data component that can be configured so the device can serve as a master control server device or a secondary device of an EPS.

In an embodiment illustrated by FIG. 1, each respective MCN 112, 114, 116, 118 includes a respective control server device 122, 124, 126, 128, and each control server device can be communicatively coupled with a respective base station 132, 134, 136, 138. One or more control server devices (e.g., 122, 124, 126, 128) of a system can include a best backhaul link available control module 101. In the embodiment illustrated in FIG. 1, MCN 112 is a master control server device, and includes a best backhaul link available control module 101.

Master control server device 112 of system 100 can provision a secondary control server device with a static IP address. Master control server device 112 can manage IP connectivity and can act as a proxy for one or more secondary control server devices. In an embodiment, a secondary control server device can provide mobile services to a UE within its coverage area. A secondary control server device of system 100 can rely upon a single gateway router including a best backhaul link available control module 101 for its network side communications to a backbone network. System 100 may include tunneling IP traffic between the master and secondary devices. Tunneling includes encapsulating every IP packet, including addressing information of its source and destination IP networks, within another packet format native to the transit network so that handover operations may be performed.

Other system embodiments are described in the application (U.S. application Ser. No. 13/972,112 (Mobile Cellular Networks)), the disclosure of which is herein incorporated by reference in its entirety and made a part of this specification.

In an embodiment, system 100 can include a plurality NOMs. In an embodiment illustrated in FIG. 1, system 100 includes a single NOM 105 of a plurality of networked MCNs (e.g., 112, 114, 116, 118). Each MCN has at least one control server device. A control server device can be master or secondary control server device in accordance with a system configuration. MCN 112 can include a master control server device 122 and a base station 132. In an embodiment, MCN 118 can include a master control server device 128 and a base station 138. MCNs 114 and 116 include respective secondary core server devices 124, 126 and base stations 134, 136. Each MCN can house a control server device and at least one respective base station. For simplicity, each MCN in system 100 includes one control server device and one base station.

A MCN (e.g., Xiphos™) can be stationary or mobile and/or portable. For example, system 100 can be a system used by groups of military users. As illustrated in FIG. 1, an MCN can be located on a moving object, such as a helicopter 188, airplane, drone 186, automobile, ship, boat, or other vehicle, e.g., a military vehicle 196. MCNs 112, 114, 116, 118 can have respective coverage areas 142, 144, 146, and 148.

As illustrated, coverage area 148 associated with MCN 118, which is located on helicopter 188, may move more quickly than other coverage areas. As coverage areas move or change, UEs may need to use backhaul links to communicate outside a local sub-network via a backhaul link to a larger network, e.g., NOM 105.

In an embodiment, a local coverage area of a base station is an area within which a UE can expect to obtain good reception of a service. UEs within the same coverage area can communicate at the smaller local sub-network level of the single base station using frequencies assigned at the local base station. Besides local coverage areas, base stations 132, 134, 136, 138 have larger ranges for communicating with peer nodes. In an embodiment, a base station has a larger RF communications coverage area for RF communications with other base stations. In the embodiment illustrated in FIG. 1, base station 132 has an RF communication area 160 that reaches base station 136, and vice versa. The pictoral depictions of the coverage areas in FIG. 1 are limited by stencil options ad so are only for symbolic understanding and do not provide detail of scaled actual coverage areas.

Base station RF communication coverage area 160 can be used to depict the area of coverage that can be provided by a first available backhaul link to base station 136. A second available backhaul link to base station 136 can be satellite 180 link coverage area 170. Any MCN, such as MCN 116 housing base station 136, can have other types of backhaul links available also. For example, MCNs 112, 114, 116, 118 that form the larger network NOM 105 may communicate with each other via a backhaul network that is formed by one or more other backhaul links besides an RF backhaul link and a satellite backhaul link. An MCN may have a local base station frequency used as a backhaul link. In an embodiment, an MCN can include a backhaul link of any one or more of a satellite communication link, microwave communication link, radio wave communication link, free-space optical communication link, line-of-sight communication link, short range wireless communication link, OFDM link, Wifi link, WiMAX link, local base station frequency link, etc. Each MCN 112, 114, 116, 118 can be identified using a unique identifier, such as an IP address, MAC address, device name, random number, etc. for communications across a backhaul link.

In some embodiments, an MCN communication system (e.g., 112) can perform a search to find a routing topology by searching for other MCN communication systems within its covered area by broadcasting a query for other MCN communication systems to answer. An MCN communication system (e.g., 112) can also identify other MCN communication systems that are in proximity to it by querying location information of other MCN communication systems via a satellite communication. Other MCN communication systems (e.g., 114, 116, 118) that can be associated with the querying MCN communication system can respond with their location. If the location is within a predefined or dynamically selected distance, the MCN communication systems can be associated. For example, in some embodiments, when MCNs have adjacent or overlapping coverage area, MCNs can be associated. In some embodiments, MCNs within the predefined area can be associated regardless of whether they are adjacent or overlapping in coverage area.

In addition, MCN communication systems can be associated based on an identification of the MCN communication system and/or group or hierarchy identification. For example, if a company of soldiers has multiple MCN communication systems (e.g., MCNs 112, 114, 116, 118) spread out across different platoons, the MCN communication systems MCNs 112, 114, 116, 118 corresponding to the different platoons can be automatically associated together to form a NOM based on their relationship within the company. For example, a look up table containing identifiers of the platoons of a company and the identifiers of the MCN communication systems associated with platoons can be used to associate the MCN communication systems together to form a NOM. In some embodiments, this can be done regardless of the distance between the platoons.

In some embodiments, upon detecting the other MCN communication systems 114, 116, 118, MCN 112 can perform a security check to determine whether it can associate with the other MCN communication systems 114, 116, 118. If the second MCN communication systems 114, 116, 118 pass the security check, the MCN communication systems 112, 114, 116, 118 can be associated to form a NOM. In certain embodiments, upon detecting the MCN communication systems 112, 114, 116, 118, the systems are associated without a security check.

Once the MCN communication systems 112, 114, 116, 118 have been associated, in some embodiments, a user can select one of the MCN communication systems 112, 114, 116, 118 to have its corresponding control server device 122, 124, 126, 128 set as the master control server device. In the embodiment illustrated in FIG. 1, MCN communication system 112 is selected to have a master control server device 122. The remaining MCN communication systems 114, 116, 118 are then identified as having secondary devices 124, 126, 128. However, any one of the MCN communication systems 112, 114, 116, 118 can be selected to have a master control server device.

In some embodiments, the master control server device 122 can be selected, or identified, automatically based on one or more factors. For example, the master control server device 202 can be selected based on its elevation. The elevation can be obtained from a GPS unit or similar device. For example, coverage areas corresponding to MCN communication systems at higher elevations can have a greater coverage area and therefore be more desirable as a master control server device. Further, in battlefield conditions, MCN communication systems at higher elevations may be safer. Accordingly, in some embodiments, the MCN communication system at a higher elevation or the highest elevation can be selected as the master control server device. In certain embodiments, the MCN communication system at a lower elevation, or the lowest elevation, can be selected as the master control server device.

In some embodiments, the master control server device is selected based on which MCN communication system has the strongest and/or most reliable connection with a backhaul link. In certain embodiments, the master control server device 202 can be selected based on the range of the corresponding coverage area. The MCN communication systems can analyze radio strength, frequency spectrum, surrounding terrain features (e.g., elevation changes, climate, etc.), and other factors to estimate the range of the different coverage areas. The terrain features can be obtained by determining the location of the MCN communication systems using a global positioning satellite system (GPS) or other location identification system and using one or more maps, such as a topographical map, etc. In some embodiments, the MCN communication system corresponding to the coverage area with the largest coverage area can be selected as the master control server device. In certain embodiments, the coverage area with the smallest range or middle range can be selected as the master control server device. In certain embodiments, the master control server device 202 can be selected based on its location. For example, the MCN communication system that is closest to or farthest away from a command center can be selected as the master control server device. Location information of the command center can be compared with location information of the MCN communication systems to determine the distance between them.

Furthermore, a master control server device can be selected based on an identifier of the MCN communication systems and/or an identifier of a group associated with the MCN communication system. With reference to the example above regarding the NOM composed of MCN communication systems associated with platoons in a company, the MCN communication system associated with the company commander can be automatically designated as the master control server device.

Once a master control server device 122 has been selected, the master control server device 122 obtains various types of information from the secondary devices 124, 126, 128 and/or other master control server devices. For example, the master control server device 122 can obtain the UE information of the UEs in the different coverage areas 142, 144, 146, 148. The master control server device 122 can also obtain additional information from the MCN communication systems 112, 114, 116, 118 such as the location of each MCN communication system 112, 114, 116, 118, network configuration parameters, error information, routing table information, and the like. In some embodiments, the master control server device 122 does not obtain any information, but simply passes information along to the secondary devices 124, 126, 128 and/or master devices, such as information about which UEs that are registered with the NOM and other NOM data. Once the master control server device 122 has obtained the information from the different MCN communication systems 112, 114, 116, 118, the master control server device 122 generates data that is to be shared between the MCN communication systems 112, 114, 116, 118, such as EPC signalling data, e.g., system and configuration data.

The generated data can also be referred to as NOM data. The master control server device transmits the NOM data to all of the control server devices 112, 114, 116, 118. In this way, all of the MCN communication systems 112, 114, 116, 118 include all of the information regarding the NOM. In some embodiments, the NOM data includes all the data found on the master control server device, including information regarding other NOMs. In certain embodiments, the NOM data only includes data concerning a particular NOM.

Additional MCN communication systems can be added to the NOM 105 as desired. In some embodiments, a user can associate a new MCN communication system to the other MCN communication systems that already form part of the NOM 105. In certain embodiments, a new MCN communication system can be added based on the factors described above, such as proximity to the NOM, hierarchical information, etc. Once the new MCN communication system is added, the master control server device 122 retrieves the user data and other information from the new MCN communication system, such as new routing information. The master control server device 122 updates its NOM data and then transmits the NOM data to all of the control server devices 122, 124, 126, 128, and the new MCN communication system. As mentioned previously multiple MCN communication systems can be networked together to form a NOM. The MCN communication systems in the NOM can implement an all-IP based communication architecture, such as 4G LTE, to provide further functionality and flexibility.

Furthermore, each MCN communication system in a NOM can include a unique identifier, such as an IP address, and each UE associated with each MCN communication system can include its own unique identifier, which can also be an IP address. The UEs can include, but are not limited to, cell phones, smart phones, tablet computers, personal computers, reconnaissance devices, tracking devices, targeting devices, weapons systems, and/or any portable electronic device configured to communicate with one or more MCN communication systems.

To create a NOM, multiple MCN communication systems can be identified for association. The MCN communication systems can be identified by a user and/or automatically identified based on proximity to each other, radio signal communications between MCN communication systems, hierarchical information, and the like, as will be described in greater detail below. Further, the MCN communication systems can be associated together by associating their unique identifiers in a data store of one of the MCN communication system, or in some other location.

Once the MCN communication systems are associated together, one MCN communication system can be identified as the Master MCN communication system ("master control server device"), while the remaining MCN communication systems can be identified as the secondary MCN communication systems ("secondary device(s)"). Additional MCN communication systems can be added by identifying additional MCN communication systems, as described above, and associating the additional MCN communication systems with the MCN communication systems in the NOM.

The master control server device can retrieve data from each associated MCN communication system, such as the unique identifiers of the UEs within each coverage area, location information, and other configuration information to generate a database of all UEs throughout the NOM. The master control server device can then share the database of information, or parts thereof, with all of the secondary devices to ensure that every MCN communication system in the NOM includes the desired information. The master control server device can communicate with the secondary devices to retrieve and synch data via any number of links including backhaul links.

The data that is shared with all the MCN communication systems in the NOM can include a look-up table identifying the other MCN communication systems within the NOM, unique identifiers to communicate with different components of the MCN communication systems within the NOM, and the coverage area where the UEs in the NOM are located. Thus, when a first UE within a coverage area attempts to transmit data to a second UE, the UE can communicate with a first MCN communication system (the MCN communication system corresponding to the coverage area) to obtain the unique identifier of UE and/or transmit the data for UE via the first MCN communication system.

As used herein, adjacent coverage areas include to coverage areas that have overlapping coverage and/or coverage areas that are close enough to each other such that a UE can move from one coverage area to another coverage area without losing the ability to communicate with at least one MCN communication system. Furthermore, as used herein, adjacent MCN communication systems refers to MCN communication systems corresponding to adjacent or overlapping coverage areas.

In addition, to the look-up table of the MCN communication systems within the NOM and the UEs within the NOM, the master control server device can include information regarding communication with other devices outside the NOM, such as other master control server devices in other NOMs, other typical cellular networks, etc.

As the MCN communication systems are likely to be moved during operation, in some embodiments, the master control server device can track the location of each MCN communication system within the NOM. In this way, the master control server device can use its own location information and the location information of the secondary devices to determine which MCN communication systems are adjacent and can complete a UE handover with other MCN communication systems.

As illustrated in FIG. 1, system 100 includes the NOM 105, which allows for communications between UEs in different coverage areas. As part of the NOM data received from the master control server device 122, each of the control server devices 124, 126, 128 can include information regarding where UEs in the NOM are located and what route across the NOM network including a backhaul network is available to reach the UE. Using this information, the control server devices 124, 126, 128 can transmit data between UEs in different coverage areas. If one UE requests a transmission of data to another UE in the same coverage area, the corresponding MCN communication system can authenticate the requesting UE by communicating with the master control server device. In some embodiments, such as when a MCN communication system is in a networked mode, once the UE has been authenticated, the data from the UE can be transmitted to a backhaul communication link for routing from one coverage area to another coverage area/s.

For example, as illustrated in FIG. 1, if a UE 10 is located in coverage area 146, seeks to transmit data to the UE 12, in coverage area 144, UE 10 can gain radio access and establish a packet data session. In an embodiment, UE 10 sends data to control server device 126. If the control server device 126 is in networked mode it may perform communications 50, 52 to gain radio access including authenticating UE 10 with the NOM 105 by communicating with a master control server device, e.g., master control server device 122. Once authenticated, the control server device 126 can establish and perform packet data session communications 60, 62, 64, 66 between UE 10 and UE 12 using backhaul communications 62, 64 (e.g., via satellite 180) across a backhaul satellite link 170. Using IP routing techniques, the data will eventually be routed to the UE 12 via the MCN communication system 114. A backhaul link can be integrated with a node or can be accessed from a secondary customer backhaul asset, such as a satellite that is not controlled by the NOM provider. In an embodiment, a satellite can be identified as part of a NOM.

In an embodiment, a node allocates backhaul link use for evolved packet core (EPC) signaling (e.g., system and/or configuration information), UE data traffic, or application server to application server traffic. In an embodiment, a node allocates backhaul link use for evolved packet core (EPC) signaling over UE data traffic and/or application server to application server traffic. In an embodiment, a node allocates backhaul link use for evolved packet core (EPC) signaling and application server to application server traffic over UE data traffic and/or application server to application server traffic.

In an embodiment, NOM 105 allows for the use of manual configuring of the node relations (e.g., base station 132, 143, 136, 138 relations) by an operator and/or automatic configuring. In an embodiment, NOM 105 uses a self-organizing network feature, such as Automatic Neighbor Relation (ANR) functionality to configure the connectivity between neighbor nodes. ANR functionality can reside at each base station in NOM 105. In an embodiment, each base station 132, 134, 136, 138 stores and executes a locally stored Neighbor Relation Table (NRT), which adds new peer neighbors and removes outdated peer neighbors. ANR can rely on a UE to detect unknown peers or cell frequency information and report it to the base stations. Nodes in NOM 105 can dynamically learn about the presence of other nodes and make intelligent decisions about how best to provide network connectivity when a node is moved. Network connectivity includes RF network connectivity across adjacent or overlapping nodes. Network connectivity can also include a sub-network of backhaul connectivity. Master nodes can provide backhaul connectivity to their associated secondary nodes.

Secondary nodes (e.g., base stations 114, 116, 118) can get configuration information from a master node (e.g., base station 112) via a backhaul link with a master node. NOM 105 can use Access Point Names (APNs) to establish connectivity between UEs. In an embodiment, backhaul traffic may be isolated using APNs. APNs can enable a UE to be attached to multiple networks at the same time. In an embodiment, a UE may have an IP address assigned from different NOM systems and can choose which NOM to use. In an embodiment, a node can have one or more backhaul links that provide communications to other nodes within the system or outside of the system or other IP devices of a larger system. In an embodiment, backhaul connectivity using a backhaul link can provide a direct route to other sub-networks of a system. In an embodiment, a backhaul link can provide a direct route to another system using the same PLMN or another system having another PLMN. In an embodiment, a backhaul link can be used to connect local area networks to a wide area network. In an embodiment, a backhaul link can be used to efficiently span distances is a network.

Nodes are provided with a backhaul link to a backhaul network or what in commercial enterprises is called a core network. A backhaul link can provide a device with network communications to the global Internet or other remote network. A backhaul link can be established using a gateway device or other backbone network device. In an embodiment, a master core device (e.g., 112) can provide gateway access to other devices in NOM 105. In an embodiment, NOM 105 includes a mobile base station node, which can move out of range of a RF communications area of a neighboring base station node so that communication with a neighboring base station node is unavailable. In an embodiment, a backhaul link can be provided between nodes via a backbone network device, such as a relay device (e.g., satellite 180) or other routing device. In an embodiment, when local RF communications between nodes are unavailable, a base station node can communicate using another backhaul link, e.g., backhaul link via satellite 180.

In an embodiment, backhaul link configuration can include configuring APN to PGW peer mapping for all node peers during the node configuration for the node network (e.g., NOM 105). In an embodiment, connectivity is available to all APNs within the network. In an embodiment, connectivity can be restricted to ensure other node networks are not allowed to share users, routing, or forwarding of packets. In an embodiment, each node has a backhaul connection. In an embodiment, each node includes a best backhaul link available control module 101. In an embodiment, each UE is configured with at least one node APN. A UE can move freely between nodes. In an embodiment, each node has a configuration of a PGW peer node in its MME configuration with a corresponding host name for its APN. Synchronization of node information occurs to update all nodes on a network. In an embodiment, each node has information about peer node data, RF neighbor nodes, proximity to other peer.

Figure 2:
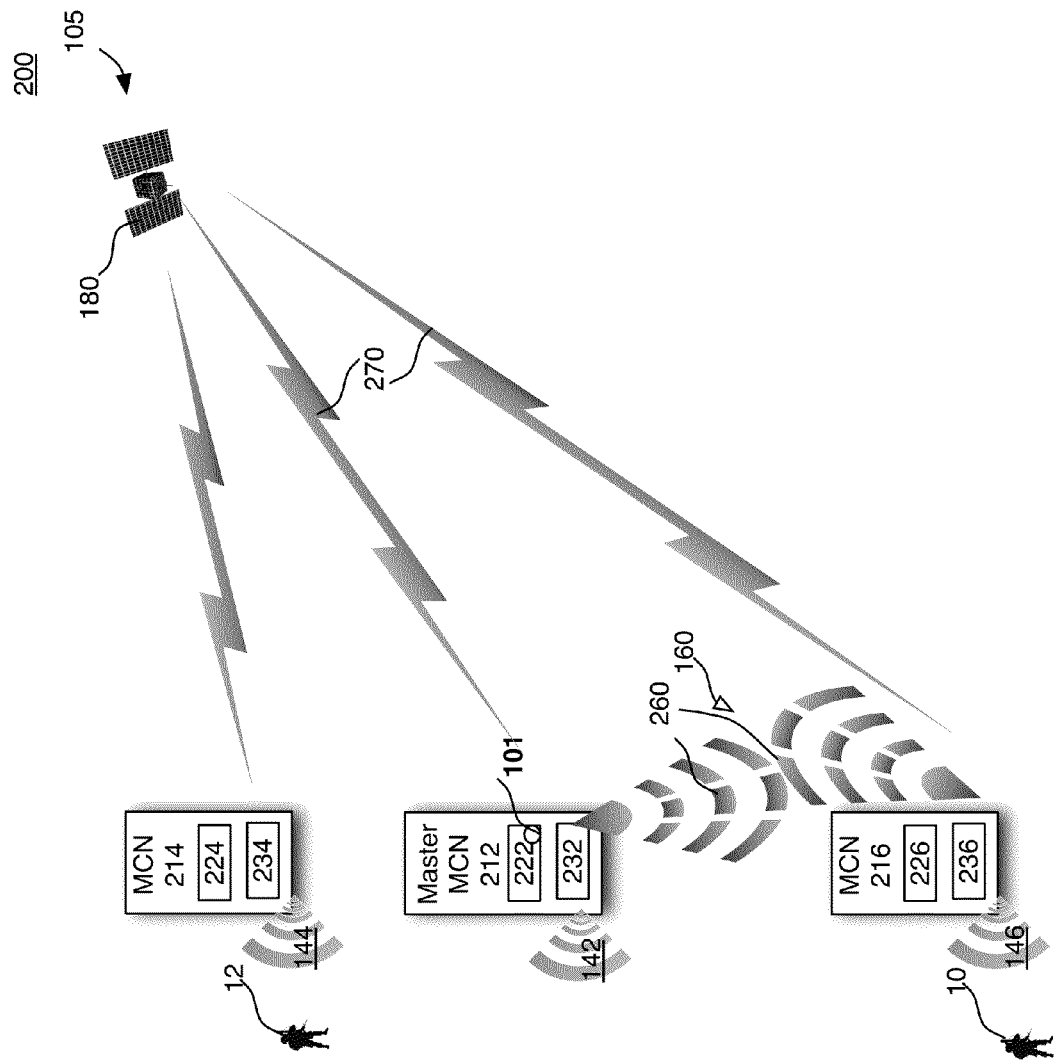
FIG. 2 is a block diagram of example architecture of a network including a plurality of backhaul link options in accordance with an embodiment of the present disclosure.

In a another embodiment, FIG. 2 is a block diagram of example architecture of a network including a plurality of backhaul link options in accordance with an embodiment of the present disclosure. As described in FIG. 1, MCN 212 has a plurality of physical backhaul links to the same or different other nodes (e.g., MCN 216, 214). For example, MCN 112 has a first physical link, such as a satellite link 270, including a first logical backhaul link, which communicatively couples MSN 112 to another node (e.g., MCN 116). For example, MCN 112 has a second physical link, such as a RF link 260, including a second logical backhaul link, which communicatively couples MSN 112 to another node (e.g., MCN 116). In an embodiment, a physical link includes one or more logical links. In an embodiment, a physical link includes an electronic communication between two devices. In an embodiment, physical link includes a first logical link 270 from MCN 212 to MCN 216 and a second logical link from MCN 212 to MCN 214.

A physical backhaul link can be a hardwire or wireless backhaul link. A physical link can be divided into logical links by multiplexing, which can be further divided into packet data sessions. A packet data session begins when the user invokes packet data service. A packet data session ends when the user or the network terminates packet data service. A logical backhaul link can use IP addressing to route IP packets to the destination node or server. RF links rely solely on allocated session information to route IP packets through an access point to a UE. A UE can handover data sessions through new access points without changing IP address.

In an embodiment, a physical backhaul link may be used for control signaling services, such as authentication, establishing a packet session, etc. or data delivery services. A backhaul link can be integrated with a node (e.g., RF link 160) or can be accessed from a secondary customer backhaul asset (e.g., satellite 180).

Figure 3:
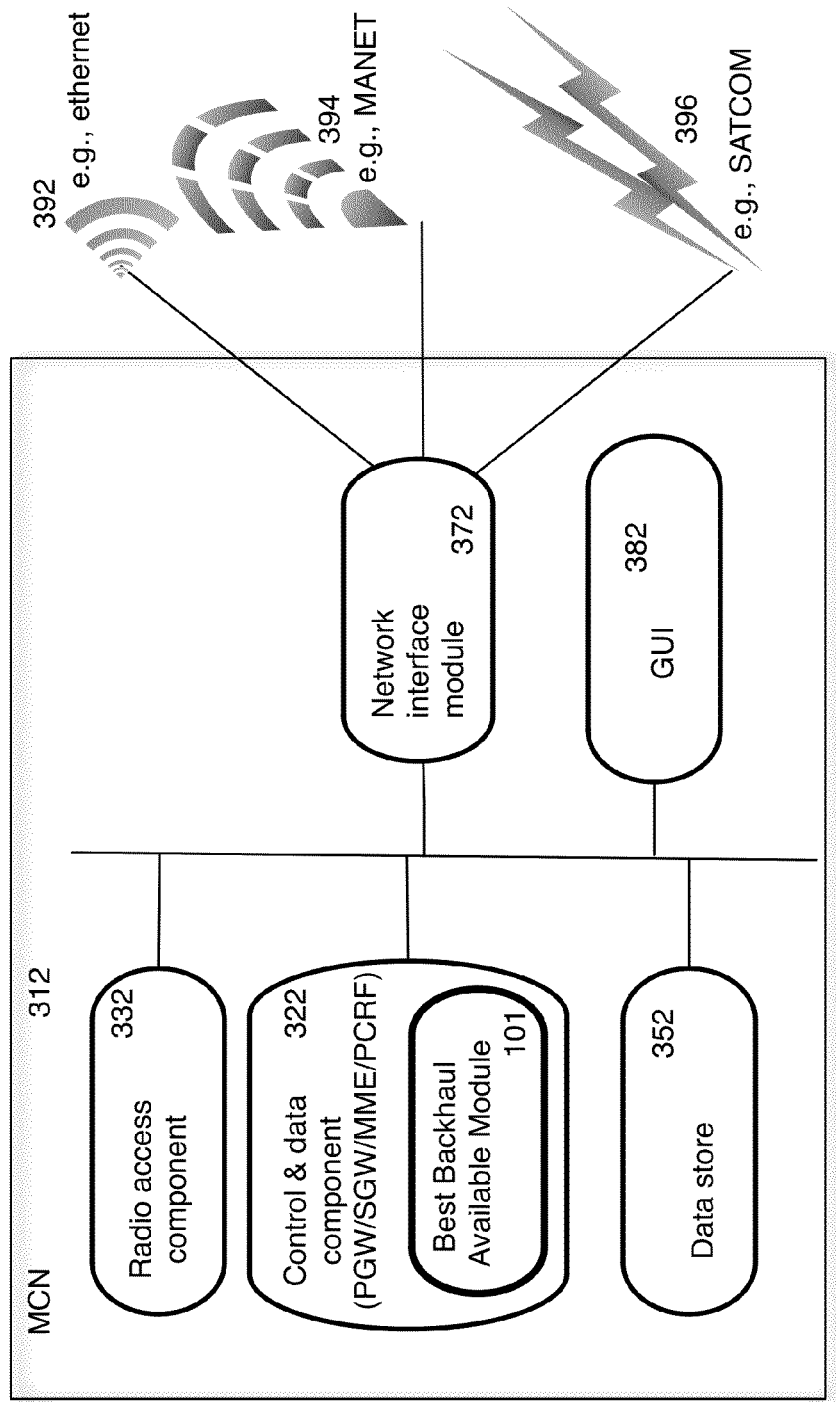
FIG. 3 is a block diagram of example architecture of a node including a best backhaul available link quality determination module in accordance with an embodiment of the present disclosure.

FIG. 3 is a block diagram of example architecture of an MCN type of node 300 including a best backhaul available link quality determination module 101 in accordance with an embodiment of the present disclosure. The node is an embodiment of an apparatus (e.g, MCN 112) for routing backhaul link communications in a wireless communication network (e.g., NOM 105). The apparatus includes a plurality of backhaul links (e.g., 392, 394, 396) each link communicatively coupling the apparatus to one of a plurality of peers (e.g., MCN 114, 116, 118) in the wireless communication network (e.g., 105). The apparatus includes a backhaul link metric collection module which collects metrics associated with each backhaul link of the plurality of backhaul links. In an embodiment, the network interface module 372 or the best backhaul available module 101 of the control and data component 322 can include the metric collection module. The apparatus includes a backhaul link parameter calculation module which calculates one or more calculated backhaul link parameters based upon the collected metrics, the one or more calculated parameters including a parameter besides a transmission success rate of Hello packets. In an embodiment, the best backhaul available module 101 can include the backhaul link parameter calculation module. The apparatus includes a best backhaul link quality determination module which determines a link quality for each of the plurality of backhaul links based upon the calculated backhaul link parameters. In an embodiment, the best backhaul available module 101 can include best backhaul link quality determination module. The apparatus includes a communications routing module which routes communications between the apparatus and one of the peers of the wireless communication system via the determined best backhaul link available. In an embodiment, a processing module of a node can include the communications routing module. In an embodiment, the best backhaul available module 101 can include the communications routing module.

The apparatus provides a backhaul link (e.g., 392, 394, 396) to a sub-network of a plurality of end user equipment (UE). In an embodiment, the apparatus and each peer are peers with respect to each peer having an IP address, and the wireless communication network is a long-term evolution (LTE) network. In an embodiment, the apparatus includes a peer update module, which notifies the peers in the network of the determined link qualities. In an embodiment, the metrics the apparatus collects include a transmission success rate and a delay value. In an embodiment, the apparatus uses weight values associated with each of a delay value, a link priority value, and a transmission success rate. In an embodiment, the parameters include weight values set in accordance with a user preference setting. In an embodiment, the parameters include a normalized transmission success rate, a normalized delay value, a normalized link priority value, an associated weight for the normalized transmission success rate, an associated weight for the normalized delay value, and an associated weight for the normalized link priority value. In an embodiment, the parameters, for each link 1, a normalized transmission success rate NHR(1)), a normalized delay value NLT(1), a normalized link priority value NLP(1), an associated weight for the normalized transmission success rate, an associated weight for the normalized delay value, and an associated weight for the normalized link priority value; wherein determining the link quality LQ(1) for each of the plurality of backhaul links includes using a formula wherein LQ(1)=(NHR(1)×WNHR(1)+NLT(1)×WNLT(1)+NLP(1)×WNLP(1))/10.

A best backhaul available link quality determination module 101 can be part of an MCN communication system 312 including other components. In the illustrated embodiment, the MCN communication system 312 includes a radio access component 332, control and data component 322, data store 352, and a graphical user interface 382. The MCN communication system can include a network interface module 372 to communicate with a plurality of backhaul links via e.g., an antenna, satellite link, and the like. The plurality of backhaul links can include an ethernet backhaul link 390, a MANET backhaul link 394, and a satellite backahul link 396.

The control and data component 322 may include a best backhaul available link quality determination module 101. The control and data component 322 can be implemented using one or more computer processors, FPGAs, microcontrollers, etc., and performs the various operations of the MCN communication system 312. In an all-IP network architecture, such as a 4G LTE network, the control and data component 322 can include a packet data network gateway (PGW), serving gateway (SGW), mobility management entity (MME), and policy and charging rules function (PCRF). The PGW can provide the IP traffic interface between the UE and external IP networks. Together with the SGW, the PGW can route all IP packets between the UE and the external IP network.

The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UEs, the SGW can terminate the downlink data path and trigger paging when downlink data arrives for the UE. The SGW can also manage and store UE contexts, e.g. parameters of the IP bearer service, network internal routing information. The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 322 can perform the attachment and detachment of UEs, authentication procedures, gateway selection, managing PDN connections, UE tracking and paging, etc. The control and data component 332 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like.

The control and data component 322 can perform additional procedures as will be described herein. For example, the control and data component 322 can communicate with other MCN communication systems to create a NOM, establish communications between UEs that are within the coverage area corresponding to the MCN communication system, identify MCN communication systems associated with UEs in other coverage areas, identify MCN communication systems that are available for handover operations, perform the synching operations with other MCN communication systems, identify non-responsive MCN communication systems, etc.

The data store 352 can include data regarding the UEs in communication with the MCN communication system 312 and within the coverage area corresponding to the MCN communication system 312, such as UE location, authentication keys, etc. In some embodiments, such as an all-IP network architecture or 4G LTE network, the data store 352 can include a home subscriber server (HSS).

The HSS can include subscription information for all UEs associated with the MCN communication system, or within a NOM. The HSS can store, for example, authentication parameters, security keys, and subscription information for UEs within the NOM or associated with the MCN communication system. Furthermore, the HSS can include subscriber location information and be involved with subscriber data handling, authentication procedures, etc.

Similarly, the data store 352 can further include data identifying other MCN communication systems within the NOM, location information of the MCN communication system within the NOM, communication protocols, data regarding the master control server device and secondary devices of the NOM, data identifying all the UEs within the NOM and the coverage areas where the UEs are located, etc. The data in the data store 352 can be used by the control and data component 322 to manage the UEs in the coverage area.

In an embodiment, the radio state of a UE is not tied to application layer connectivity. In an embodiment, radio access component 332 tearing down the radio context within the local radio network (e.g. via network interface module 372) terminates the physical radio link between the UE and the base station, but this does not affect the state of any packet data sessions (e.g, TCP or UDP sessions). The UE can be idle, with no link to the local radio network, while the established connections are maintained by the control and data component 322 (e.g., PGW). Once application data must be delivered, the physical radio link is reestablished (e.g. via network interface module 362), and communication resumes. In an embodiment, the link quality of each backhaul link is computed by the link quality procedure based on a set of measurement metrics. In an embodiment, the set of measurement metrics do not include only packet loss rate. In an embodiment, the set of measurement metrics include link latency, link priority and connection cost. In an embodiment, the determined link quality can eventually determine the best backhaul route for each peer node. In an embodiment, the best backhaul available module 101 is a plug-in inside an OLSR routing daemon of the MCN 312. In an embodiment, the best backhaul available module 101 is periodically woken up by an OLSR timer scheduler to compute the backhaul link quality and to determine a best route.

In an embodiment, the best backhaul available module 101 parameters are configurable through a dashboard graphical user interface (GUI) 382. In an embodiment, the GUI 382 presents one or more of an OLSR routing table, OLSR per interface information table, OLSR interface parameters configuration table, OLSR interface parameters. In an embodiment, the GUI 382 accepts user input including one or more of backhaul link priority, backhaul link user preference. In an embodiment, the data store 352 stores one or more of backhaul link interface name, backhaul link packet loss rate, backhaul link interface latency, and backhaul link interface priority.

In an embodiment, a method of routing backhaul link communications in a wireless communication network includes communicatively coupling an apparatus to each of a plurality of peers in the wireless communication network with each of a respective backhaul link of a plurality of backhaul links, collecting metrics associated with each backhaul link of the plurality of backhaul links, calculating backhaul link parameters based upon the collected metrics, determining a link quality for each of the plurality of backhaul links based upon the calculated backhaul link parameters, determining a best backhaul link available based on the determined link qualities, and routing communications between the apparatus and one of the peers of the wireless communication system via the determined best backhaul link available. The collected metrics include metrics besides a transmission success rate of Hello packets.

Figure 4:
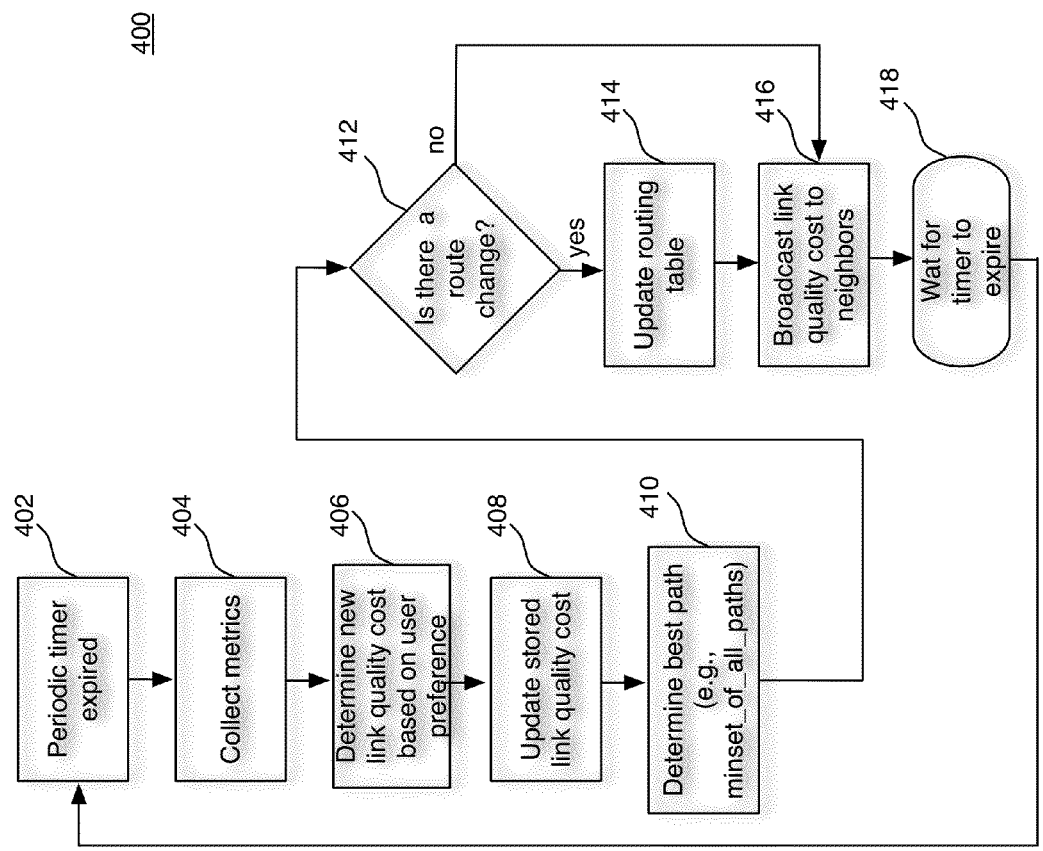
FIG. 4 is a flow diagram of a method for updating a routing table with a best path between nodes based on a set user preference in accordance with an embodiment of the present disclosure.

FIG. 4 is a flow diagram of a method 400 for updating a routing table with a best path between nodes based on a set user preference in accordance with an embodiment of the present disclosure. In an embodiment, method 400 is based upon a method for calculating one or more backhaul link parameters besides a transmission success rate of Hello packets. In an embodiment, a best backhaul available module 101 can receive information about a newly discovered peer node. In an embodiment, a best backhaul available module 101 can receive information about a routing connection from a routing daemon of a control server 322 of a node (e.g., MCN 312). The best backhaul available module 101 can receive information about a routing connection from a layer 3 routing protocol. In an embodiment, the network is a MANET network and the layer 3 routing protocol is OLSR. The best backhaul available module 101 can support any layer 2 transport solution as a backhaul link. In an embodiment, a backhaul link is used for signaling and OAM only and not for traffic. In an embodiment, as illustrated in FIG. 1, a backhaul link is used for signaling and OAM (e.g., to transfer communications 52) and for packet data traffic (e.g. communications 62, 64).

In the embodiment illustrated in FIG. 4, a best backhaul available module 101 of a node, e.g., MCN 312 can perform a method 400 for updating a routing table with a best path between nodes based on a set user preference. A periodic timer is run and is set to expire periodically (402). In an embodiment, the timer expires after about 1 minute, or any other set or determined time. The timer expiring triggers the best backhaul available module 101 to collect measurement metrics for each backhaul link (404). In an embodiment, collecting measurement metrics per backhaul link includes checking for protocol messages (e.g., OLSR Hello and/or TC messages) or other messages transported on the link. The best backhaul available module determines a new link quality cost (406) based upon a set user preference that associates weight factors to each of a plurality of the collected measurement metrics. The best backhaul available module 101 updates a stored link quality parameter with a new link quality cost determination (408). The best backhaul available module 101 determines a best path (e.g., using a routing protocol, such as a open shortest path first (OSPF) protocol or other protocol, and using a comparison, such as a minimum of all link quality costs per link) (410). The best backhaul available module checks if a route change has occurred (412). If not, the determined link quality cost values are broadcast to neighbors (416). If a route change determination has occurred (412), then the best backhaul available module 101 updates the routing table (e.g., update OLSR routing table) (414). The best backhaul available module 101 broadcasts the newly determined link quality cost to neighbors (416). The best backhaul available module 101 runs a timer (418). When the timer expires 402) the method 400 is repeated.

In an embodiment, a new backhaul link quality cost is determined (406) based upon a parameter besides a transmission success rate of Hello packets. In an embodiment, a new backhaul link quality cost is determined (406) based upon a parameter including one or more of a transmission success rate, a delay value, and a link priority value. In an embodiment, a new backhaul link quality cost is determined (406) based upon parameters including each of a transmission success rate, a delay value, and a link priority value. In an embodiment, a more precise cost computation for each link can be achieved by determining link quality cost based upon parameter besides a transmission success rate of Hello packets.

In an embodiment, determination of link quality cost based upon a user preference (406) includes determining a Hello packet transmission success rate, determining a normalized value for the Hello packet transmission success rate, determining link latency of Hello packets, normalizing the link latency, and collecting a user set link priority preference. In an embodiment, the collected metrics can be scaled by associated scaling factors. In an embodiment, a user preference is a set of weighted scaling factors assigned to each determined link measurement (e.g., success of Hello packet transmissions, link latency, etc.).

In an embodiment, key performance indicators can be used to identify another "cost" of each backhaul link. The cost can be a measurement that can be easily understood as a level of quality. Other metrics, such as latency, jitter (latency variation), and congestion can be used in another embodiment of collecting metrics (404) and determining a link quality cost (406). In another embodiment, link consistency %=(average throughput−Jitter measurement)/expected max throughput can be used in determining link quality cost (406). In this case, the "Jitter measurement" can be a set threshold number/s identifying any one of: excellent, good, and poor jitter.

In an embodiment, the link quality can be described by the following procedure. The link quality LQ(1) of a backhaul link 1, is:

$$LQ(1)=(NHR(1) \times WNHR(1) + NLT(1) \times WNLT(1) + NLP(1) \times WNLP(1))/10$$

HR(l) is the measured Hello packet transmission success rate. NHR(l) represents the normalized value of HR(l) as illustrated in Table 3. The constant 10 can be substituted for any constant value that produces numbers in a range that is good for presentation on a GUI or for storage requirements.

TABLE 3

Normalization Table for Hello Packet Transmission Successful Rate

| Hello Packet TX Success Rate | NHR(l) |
|---|---|
| 0.99 < HR(l) ≤ 1 | 10 |
| 0.90 < HR(l) ≤ 0.99 | 9 |
| 0.85 < HR(l) ≤ 0.90 | 8 |
| 0.80 < HR(l) ≤ 0.85 | 7 |
| 0.70 < HR(l) ≤ 0.80 | 6 |
| 0.60 < HR(l) ≤ 0.70 | 5 |
| 0.50 < HR(l) ≤ 0.60 | 4 |
| 0.45 < HR(l) ≤ 0.50 | 3 |
| 0.40 < HR(l) ≤ 0.45 | 2 |
| HR(l) ≤ 0.40 | 1 |

LT(l) is the measured link latency of Hello packets in milliseconds. NLT(l) is the normalized value of LT(l) scaled from 1 to 10. The higher number means a shorter link delay. The normalized values are shown in Table 4.

TABLE 4

Normalization Table for Link Latency

| Link Latency (in ms) | NLT(l) |
|---|---|
| Delay (l) ≤ 10 | 10 |
| 10 < Delay (l) ≤ 50 | 9 |
| 50 < Delay (l) ≤ 100 | 8 |
| 100 < Delay (l) ≤ 150 | 7 |
| 150 < Delay (l) ≤ 200 | 6 |
| 200 < Delay (l) ≤ 250 | 5 |
| 250 < Delay (l) ≤ 300 | 4 |
| 300 < Delay (l) ≤ 400 | 3 |
| 400 < Delay (l) ≤ 500 | 2 |
| 500 < Delay (l) | 1 |

NLP(l) is the normalized link priority defined by the user. The normalized link priority can be scaled from 1 to 10. The higher number means the user prefers the link more. The default value of normalized link priority can be 5.

WNHR(l), WNLT(l), and WNLP(l) are weighted values set for the corresponding metrics based upon a user preference. The weighted values can be set as a percentage. The higher the percentage the more important the metric is. A user can set the weighted values individually or all at once. The default user preference can be set to low. Table 5 illustrates an example set of associated user preference weights. Other user preferences and weights can be used.

TABLE 5

Weight Table for the metrics

| User Preference | WNHR(l) | WNLT(l) | WNLP(l) |
|---|---|---|---|
| High | 20% | 20% | 60% |
| Medium | 30% | 30% | 40% |
| Low | 40% | 40% | 20% |

$$LQ(l)=(NHR(l)\times WNHR(l)+NLT(l)\times WNLT(l)+NLP(l)\times WNLP(l))/10$$

In an embodiment, a node stores link quality values for all of its network links or for all of the links it has designated as a backhaul link. A node broadcasts its link quality values to its neighbors. Neighbor nodes store the received LQ(l) as a neighbor link quality NLQ(l). The node can determine a best backhaul link quality cost (BBA-LQ(l) of link l by performing the method symbolized by:

$$BBA\text{-}LQ(l)=1/(LQ(l)\times NLQ(l))$$

In an embodiment, the best route between two nodes (A, B) is the minimum cost of the set of all the link qualities between the two nodes.

$$\text{Min}\{\text{set\_of\_all\_paths}(A,B)[\text{summation}(BBA-LQ(l))]\}.$$

The following is an example embodiment. A first backhaul link is an Ethernet link (e) and as second backhaul link is a MANET link (m). The user preference is set to "High" in accordance with eth metrics in Table 5.

In an example, the Hello packets transmission success rate for the example Ethernet link is HR(e)=0.9. According to the example normalization table, NHR(e)=8. Assume that the normalized link latency NLT(e)=9 and the normalized link priority NLP(e)=5, then LQ(e)=(8×20%+9×20%+5×60%)/10, which gives a link quality for the Ethernet link to be LQ(e)=0.64.

Assume the neighbor link quality NLQ(e) is 0.65. Then BBA-LQ(e)=1/(0.64×0.65)=2.4.

In the example, the Hello packet transmission rate for the example MANET link (m) is HR(m)=0.7, so according to the example normalization in Table 3, NHR(m)=5. Assume NLT (m)=8 and the normalized link priority NLP(m) is set to 8. Then LQ(m)=(5×20%+8×20%+8×60%)/10, which gives the link quality for the MANET link to be LQ(m)=0.74.

Assume the neighbor link quality NLQ(m) is 0.75. Then BBA-LQ(m)=1/(0.74×0.75)=1.8.

In this example embodiment, The MANET link of the node has a better link quality (i.e. lower link quality cost) that the Ethernet link according to the method even though the Ethernet link has a higher Hello packet transmission success rate and shorter latency because the user prefers the MANET link more than the Ethernet link and the user preference value is set to High. The priority of the MANET link=8 and the priority of the Ethernet link=5, defined by the user.

In an embodiment, a Hello data structure used for calculating the BBA-LQ cost is shown in the FIG. 5. The value Lq is the self link quality and the value Nlq is the neighbor link quality. The smoothed_lq is the smoothed link quality whereas the lq is the instant link quality. The windowSize is the current Hello message window size. The last_seq_nr is the sequence number of last received Hello message. The missed_Hellos stores the number of missed Hello messages. The receivedHello[ ] stores the accumulated received Hello messages and the totalHello[ ] stores the accumulated total Hello messages expected to receive. We introduced several new variables which are used for computing the link quality cost, are highlighted in red color. The HelloLatency[ ] stores the accumulated latency of Hello messages, which is calculated from the transmitted time and the received time of Hello messages.

In an embodiment, the link data structure for calculating the BBA-LQ value includes link latency, link priority, along with packet transmission success rate of Hello packets. The link_latency represents the latency of each link in milliseconds. The link_priority is the priority of each link which is defined by the user. If the user does not define it, the default value is 5 for all links. The weight_nhr, weight_lt and weight_lp are the user defined weight for each metric. Since the default user preference is low, the default values of them are 0.4, 0.4 and 0.2 respectively.

A new field called "txtime" can be introduced to the OLSR Hello message, which stores the time when the OLSR daemon broadcasts the Hello message. The neighbor can calculate the transmission time of Hello message between the transmission time and the received time of the Hello message.

The BBA-LQ function can support both IPv4 and IPv6. The implementation of all the functionalities between the IPv4 and IPv6 are remained in same whereas the only difference is inside the IP protocol header. In the first phase, the BBA-LQ function will only modify the IPv4 header and run on the IPv4 networks only. In an embodiment, the IPv6 header can be modified to support the BBA-LQ function as well.

In an embodiment, FIG. 6 illustrates a GUI display of the an example best backhaul available link quality that resulted in an update of a route cost result for a particular route in a routing table. The routing table can show the IP address of the destinations discovered by the OLSR daemon, the IP address of the next hop for each destination and the outgoing interface for each destination.

Figure 7:
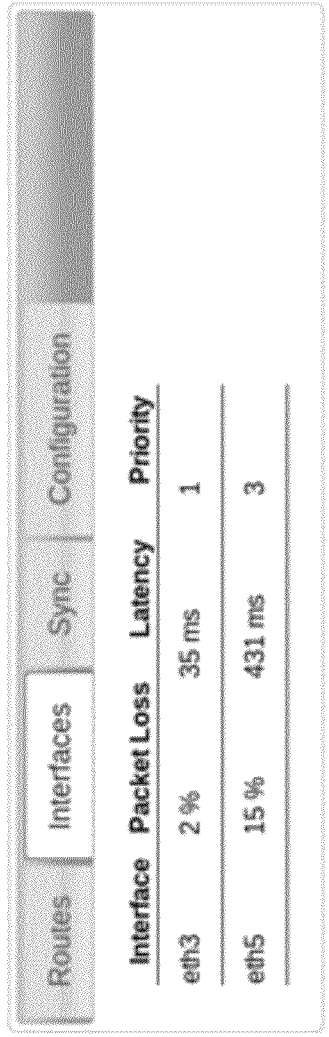
FIG. 7 illustrates a GUI display of a particular interface name, the packet loss rate of the interface, the interface latency, and the interface priority in accordance with an embodiment of the present disclosure.

In an embodiment, FIG. 7 illustrates a GUI display of a particular interface name, the packet loss rate of the interface, the interface latency, and the interface priority. The interface latency can be the average value of the sum of the latency of all links on each interface.

In an embodiment, FIG. 8 illustrates a GUI display of a page for an operator to configure the BBA-LQ parameters. The operator will have the ability to change parameters, such as the priority for each interface and the overall user preference, which affects the weight of the link quality metrics.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples.

What is claimed:

1. An apparatus for routing backhaul link communications in a wireless communication network, the apparatus comprising:
a processor coupled to a memory that stores executable instructions, wherein the processor facilitates execution of the executable instructions to perform operations;
a plurality of backhaul links each link communicatively coupling the apparatus to one of a plurality of peers in the wireless communication network;
a backhaul link metric collection module coupled to the processor to perform operations including collecting metrics associated with each backhaul link of the plurality of backhaul links, wherein the metrics include a transmission success rate and a delay value;
a backhaul link parameter calculation module coupled to the processor to perform operations including calculating one or more calculated backhaul link parameters based upon the collected metrics, the one or more calculated backhaul link parameters including a parameter besides a transmission success rate of Hello packets;
a best backhaul link quality determination module coupled to the processor to perform operations including determining a link quality for each of the plurality of backhaul links based upon the calculated backhaul link parameters;
a best backhaul available link quality determination module coupled to the processor to perform operations including determining a best backhaul link available based on the determined link qualities; and
a communications routing module coupled to the processor to perform operations including routing communications between the apparatus and one of the peers of the wireless communication system via the determined best backhaul link available;
wherein the apparatus is a core server in an Evolved Packet Core (EPC) System (EPS) and the peer is a core server in an Evolved Packet Core (EPC) System (EPS);
wherein the plurality of backhaul links includes a backhaul link from the EPS core server apparatus to the EPS core server peer.

2. The apparatus of claim 1, wherein the apparatus provides a backhaul link to a sub-network of a plurality of end user equipment (UE).

3. The apparatus of claim 1, wherein the apparatus and each peer are peers with respect to each peer having an IP address, and the wireless communication network is a long-term evolution (LTE) network.

4. The apparatus of claim 1, further including a peer update module, which notifies the peers in the network of the determined link qualities.

5. The apparatus of claim 1, wherein the plurality of backhaul links includes a logical backhaul link.

6. The apparatus of claim 1, wherein the parameters include weight values associated with each of a delay value, a link priority value, and a transmission success rate.

7. The apparatus of claim 1, wherein the parameters include a normalization value associated with a transmission success rate and a normalization value associated with a delay value.

8. The apparatus of claim 1, wherein the parameters include weight values set in accordance with a user preference setting.

9. The apparatus of claim 1, wherein the parameters include a normalized transmission success rate, a normalized delay value, a normalized link priority value, an associated weight for the normalized transmission success rate, an associated weight for the normalized delay value, and an associated weight for the normalized link priority value.

10. The apparatus of claim 1, wherein the parameters include, for each link I, a normalized transmission success rate $NHR(I)$ a normalized delay value $NLT(I)$ a normalized link priority value $NLP(I)$, an associated weight for the normalized transmission success rate $WNHR(I)$, an associated weight for the normalized delay value, $WNLT(I)$ and an associated weight for the normalized link priority value $WNLP(I)$; and
wherein determining the link quality $LQ(I)$ for each of the plurality of backhaul links includes using a formula wherein $LQ(I)=(NHR(I) \times WNHR(I)+NLT(I) \times WNLT(I)+NLP(I) \times WNLP(I))/10$.

11. A method of routing backhaul link communications in a wireless communication network, the method comprising:

communicatively coupling an apparatus to each of a plurality of peers in the wireless communication network with each of a respective backhaul link of a plurality of backhaul links;

collecting metrics associated with each backhaul link of the plurality of backhaul links;

calculating backhaul link parameters based upon the collected metrics, wherein the metrics include a transmission success rate and a delay value;

determining a link quality for each of the plurality of backhaul links based upon the calculated backhaul link parameters;

determining a best backhaul link available based on the determined link qualities; and routing communications between the apparatus and one of the peers of the wireless communication system via the determined best backhaul link available;

wherein the apparatus is a core server in an Evolved Packet Core (EPC) System (EPS) and the peer is a core server in an Evolved Packet Core (EPC) System (EPS);

wherein the plurality of backhaul links includes a backhaul link from the EPS core server apparatus to the EPS core server peer.

12. The method of claim 11, wherein the apparatus provides a backhaul link to a sub-network of a plurality of end user equipment (UE).

13. The method of claim 11, wherein the apparatus and each peer are core servers of the wireless communication network, and the wireless communication network is a long-term evolution (LTE) network.

14. The method of claim 11, further comprising notifying the peers in the network of the determined link qualities.

15. The method of claim 11, wherein the plurality of backhaul links includes a logical backhaul link.

16. The method of claim 11, wherein the parameters include weight values associated with each of a delay value, a link priority value, and a transmission success rate.

17. The method of claim 11, wherein the parameters include a normalization value associated with a transmission success rate and a normalization value associated with a delay value.

18. The method of claim 11, wherein the parameters include weight values set in accordance with a user preference setting.

19. The method of claim 11, wherein the parameters include a normalized transmission success rate, a normalized delay value, a normalized link priority value, an associated weight for the normalized transmission success rate, an associated weight for the normalized delay value, and an associated weight for the normalized link priority value.

20. An apparatus for routing backhaul link communications in a wireless communication network, the apparatus comprising:

a plurality of backhaul links each link communicatively coupling the apparatus to one of a plurality of peers in the wireless communication network;

a backhaul link metric collection module which collects metrics associated with each backhaul link of the plurality of backhaul links;

a backhaul link parameter calculation module which calculates one or more calculated backhaul link parameters based upon the collected metrics, the one or more calculated parameters including a parameter besides a transmission success rate of Hello packets;

a best backhaul link quality determination module which determines a link quality for each of the plurality of backhaul links based upon the calculated backhaul link parameters;

a best backhaul available link quality determination module which determines a best backhaul link available based on the determined link qualities; and a communications routing module which routes communications between the apparatus and one of the peers of the wireless communication system via the determined best backhaul link available;

wherein the parameters include, for each link I, a normalized transmission success rate NHR(I) a normalized delay value NLT(I) a normalized link priority value NLP(I), an associated weight for the normalized transmission success rate WNHR(I), an associated weight for the normalized delay value WNLT(I), and an associated weight for the normalized link priority value WNLP(I); and wherein determining the link quality LQ(I) for each of the plurality of backhaul links includes using a formula wherein LQ(I)=(NHR(I)×WNHR(I)+NLT(I)×WNLT(I)+NLP(I)×WNLP(I))/10.

* * * * *